US012311268B2

(12) United States Patent
Sestini et al.

(10) Patent No.: US 12,311,268 B2
(45) Date of Patent: May 27, 2025

(54) AUTOMATED VALIDATION OF VIDEO GAME ENVIRONMENTS

(71) Applicant: Electronic Arts Inc., Redwood City, CA (US)

(72) Inventors: Alessandro Sestini, Arezzo (IT); Linus Gisslén, Stockholm (SE); Joakim Bergdahl, Stockholm (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 344 days.

(21) Appl. No.: 17/983,046

(22) Filed: Nov. 8, 2022

(65) Prior Publication Data

US 2024/0050858 A1 Feb. 15, 2024

Related U.S. Application Data

(60) Provisional application No. 63/397,253, filed on Aug. 11, 2022.

(51) Int. Cl.
*A63F 13/67* (2014.01)
*A63F 13/69* (2014.01)
*G06N 3/045* (2023.01)
*G06N 3/08* (2023.01)

(52) U.S. Cl.
CPC .............. *A63F 13/67* (2014.09); *A63F 13/69* (2014.09); *G06N 3/045* (2023.01); *G06N 3/08* (2013.01)

(58) Field of Classification Search
None
See application file for complete search history.

(56) References Cited

U.S. PATENT DOCUMENTS

2020/0269136 A1* 8/2020 Gurumurthy ............ G06N 3/08
2021/0001229 A1* 1/2021 Somers .................... A63F 13/67
2021/0346798 A1* 11/2021 Borovikov ........... G06F 11/3696

OTHER PUBLICATIONS

Stahlke, Samantha et al., Artificial Players in the Design Process: Developing an Automated Testing Tool for Game Level and World Design, CHI Play, ACM, 14 pages, dated Nov. 2, 2020.

(Continued)

*Primary Examiner* — Damon J Pierce
(74) *Attorney, Agent, or Firm* — Gray Ice Higdon

(57) ABSTRACT

This specification provides a computer-implemented method comprising providing, by a user, one or more demonstrations of a video game entity interacting with a video game environment to achieve a goal. The method further comprises generating, from the one or more demonstrations, one or more training examples. The method further comprises training an agent to control the video game entity using a neural network. The training comprises generating one or more predicted actions for each training example by processing, using the neural network, input data derived from the training example, and updating parameters of the neural network based on a comparison between the one or more predicted actions of the training examples and the one or more corresponding target actions of the training examples. The method further comprises performing validation of the video game environment, comprising controlling the video game entity in the video game environment using the trained agent.

20 Claims, 6 Drawing Sheets

(56) References Cited

OTHER PUBLICATIONS

Gordillo, Camilo et al., Improving Playtesting Coverage via Curiosity Driven Reinforcement Learning Agents, arXiv:2103.13798v2, 8 pages, dated Jun. 23, 2021.
Sestini, Alessandro et al., CCPT: Automatic Gameplay Testing and Validation with Curiosity-Conditioned Proximal Trajectories, arXiv:2202.10057v1, 11 pages, dated Feb. 21, 2022.
Gisslen, Linus et al., Adversarial Reinforcement Learning for Procedural Content Generation, arXiv:2103.04847v2, 8 pages, dated Jun. 10, 2021.
Ross, Stephane et al., A Reduction of Limitation Learning and Structured Prediction to No-Regret Online Learning, 14th International Conference on AISTATS, 9 pages, dated 2011.
Holmgard, Christoffer et al., Automated Playtesting with Procedural Personas through MCTS with Evolved Heuristics, arXiv:1802.06881v1, 10 pages, dated Feb. 19, 2018.
Chang, Kenneth et al., Reveal-More: Amplifying Human Effort in Quality Assurance Testing Using Automated Exploration, University of California, 8 pages, dated 2019.
Mugrai, Luvneesh et al., Automated Playtesting of Matching Tile Games, arXiv:1907.06570v1, 7 pages, dated Jul. 15, 2019.
Iftikhar, Sidra et al., An Automated Model Based Testing Approach for Platform Games, retrieved from: https://www.researchgate.net/profile/Muhammad-Uzair-Khan-2/publication/292150724_An_Automated_Model_Based_Testing_Approach_for_Platform_Games/links/56ab2cbd08aed5a01359ca2d/An-Automated-Model-Based-Testing-Approach-for-Platform-Games.pdf, 10 pages, dated 2015.
Lovreto, Gabriel et al., Automated Tests for Mobile Games: an Experience Report, SBC Proceedings of SBGames, 9 pages, dated Nov. 1, 2018.
Cho, Chang-Sik et al., Online Game Testing Using Scenario-based Control of Massive Virtual Users, ICACT, 5 pages, dated Feb. 7, 2010.
Xiao, Gang et al., Software Testing by Active Learning for Commerical Games, AAAI, 6 pages, dated 2005.
Bergdahl, Joakim et al., Augmenting Automated Game Testing with Deep Reinforcement Learning, arXiv:2103.1519v1, 4 pages, dated Mar. 29, 2021.
Alonso, Eloi et al., Deep Reinforcement Learning for Navigation in AAA Video Games, arXiv:2011.04764v2, 13 pages, dated Nov. 17, 2020.
Devlin, Sam et al., Navigation Turing Test (NTT): Learning to Evaluate Human-Like Navigation, 38th International Conference on Machine Learning, 10 pages, dated 2021.
Zheng, Yan et al., Wuji: Automatic Online Combat Game Testing Using Evolutionary Deep Reinforcement Learning, Institutional Knowledge at Singapore Management University, 34th IEEE Conference on Automated Software Engineering, 15 pages, dated Nov. 2019.
Agarwal, Shivam et al., Visualizing AI Playtesting Data of 2D Side-Scrolling Games, IEEE Conference on Games, 7 pages, dated Aug. 24, 2020.
Bain, Michael et al., A Framework for Behavioural Cloning, University of South Wales, 37 pages, dated Jul. 30, 2001.
Knox, W. Bradley et al., Interactively Shaping Agents via Human Reinforcement, K-CAP, 8 pages, dated 2009.
Ho, Jonathan et al., Generative Adversarial Imitation Learning, 30th Conference on Neural Information Processing Systems, 9 pages, dated 2016.
Finn, Chelsea et al., A Connection Between Generative Adversarial Networks, Inverse Reinforcement Learning, and Energy-Based Models, arXiv:1611.03852v3, 10 pages, dated Nov. 25, 2016.
Peng, Xue Bin et al., AMP: Adversarial Motion Priors for Stylized Physics-Based Character Control, ACM Trans. Graph., vol. 40, No. 4, Article 144, 20 pages, dated Aug. 2021.

Zhao, Yunqi et al., Winning Isn't Everything: Enhancing Game Development with Intelligent Agents, arXiv:1903.10545v5, 14 pages, dated Apr. 28, 2020.
Harmer, Jack et al., Imitation Learning with Concurrent Actions in 3D Games, arXiv:1803.05402v5, 8 pages, dated Sep. 6, 2018.
Tucker, Aaron et al., Inverse Reinforcement Learning for Video Games, arXiv1810.10593v1, 10 pages, dated Oct. 24, 2018.
Bellemare, Marc G., The Arcade Learning Environment: An Evaluation Platform for General Agents, Journal of Artificial Intelligence, 27 pages, date Jun. 2013.
Schulman, John et al., Proximal Policy Optimization Algorithms, arXiv:1707.06347v2, 12 pages, dated Aug. 28, 2017.
Huang, Sandy, et al., Adversarial Attacks on Neural Network Policies, arXiv:1702.02284v1, 10 pages, dated Feb. 8, 2017.
Fu, Justin et al., Learning Robust Rewards with Adversarial Inverse Reinforcement Learning, arX1701.11248v2, 15 pages, dated Aug. 13, 2018.
Torabi, Faraz et al., Behavioral Cloning from Observation, Proceedings of the 27th International Joint Conference on Artificial Intelligence, arXiv:1805.01954v2, 8 pages, dated May 11, 2018.
Monteiro, Juarez et al., Augmented Behavioral Cloning from Observation, IEEE, arXiv:2004.13529v1, 8 pages, dated Apr. 28, 2020.
Xu, Tian et al., On Generalization of Adversarial Imitation Learning and Beyond, arXiv:2106.10424v3, 80 pages, dated Feb. 11, 2022.
Sinha, Samarth et al., S4RL: Surprisingly Simple Self-Supervision for Offline Reinforcement Learning in Robotics, 5th Conference on Robot Learning, 11 pages, dated 2021.
Fujimoto, Scott et al., A Minimalist Approach to Offline Reinforcement Learning, 35th Conference on Neural Information Processing Systems, 14 pages, dated 2021.
Woillemont, Pierre et al., Configurable Agent with Reward As Input: A Play-Style Continuum Generation, IEEE, arXiv:2211.16221v1, 8 pages, dated Nov. 29, 2022.
Roy, Julien et al., Direct Behavior Specification via Constrained Reinforcement Learning, 39th International Conference on Machine Learning, arXiv:2112.12228v6, 16 pages, dated Jun. 18, 2022.
Sestini, Alessandro et al., Policy Fusion for Adaptive and Customizable Reinforcement Learning Agents, arXiv:2104.10610v1, 8 pages, dated Apr. 21, 2021.
Burda, Yuri et al., Exploration by Random Network Distillation, arXiv:1810.12894v1, 17 pages, dated Oct. 30, 2018.
Druce, Jeff et al., Explainable Artificial Intelligence for Increasing User Trust in Deep Reinforcement Learning Driven Autonomous Systems, 33rd Conference on Neural Information Processing Systems, arXiv:2106.03775v1, 9 pages, dated Jun. 7, 2021.
Duan, Yan et al., One-Shot Imitation Learning, 31st Conference on Neural Information Processing Systems, 12 pages, dated 2017.
Hakhamaneshi, Kourosh et al., Hierarchical Few-Shot Imitation with Skill Transition Models, ICLR, arXiv:2107.08981v2, 19 pages, dated Mar. 10, 2022.
Finn, Chelsea et al., Model-Agnostic Meta-Learning for Fast Adaptation of Deep Networks, 34th International Conference on Machine Learning, 10 pages, dated 2017.
Kumar, Aviral et al., Conservative Q-Learning for Offline Reinforcement Learning, 34th Conference on Neural Information Processing Systems, 13 pages, dated 2020.
Chen, Lili et al., Decision Transformer: Reinforcement Learning via Sequence Modeling, 35th Conference on Neural Information Processing Systems, 14 pages, dated 2021.
Le, Hoang M. et al., Coordinated Multi-Agent Imitation Learning, 34th International Conference on Machine Learning, 9 pages, dated 2017.
Stahlke, Samantha et al., Artificial Playfulness: A Tool for Automated Agent-Based Playtesting, CHI, 7 pages, dated May 4, 2019.
Schaefer, Christopher et al., Crushinator: A Framework towards Game-Independent Testing, IEEE, 4 pages, dated 2013.

* cited by examiner

AUTOMATED VALIDATION OF VIDEO
GAME ENVIRONMENTS

In many video games, it is important to validate the design of video game environments to reduce the chances of any potential bugs or errors occurring when players play the video game. Existing approaches to performing validation the design of video game environments are often time-consuming and/or require specialized knowledge in different domains (e.g. programming, machine learning, etc.) by those performing the validation.

SUMMARY

In accordance with a first aspect, this specification provides a computer-implemented method comprising providing, by a user, one or more demonstrations of a video game entity interacting with a video game environment to achieve a goal. Each of the demonstrations specify one or more actions performed by the video game entity in the video game environment at each of one or more time steps. The method further comprises generating, from the one or more demonstrations, one or more training examples. Each training example is associated with a time step of a demonstration and comprises: (i) a segmented map of an area of the video game environment comprising the video game entity, (ii) entity data for the video game entity, wherein the entity data comprises a representation of a state of the video game entity with respect to the goal, (iii) entity data for each of one or more other video game entities in the video game environment, and (iv) one or more target actions performed by the video game entity for the time step of the training example. The method further comprises training an agent to control the video game entity using a neural network. The training comprises generating, for each training example, one or more predicted actions for the training example by processing, using the neural network, input data derived from the training example. The training further comprises updating parameters of the neural network based on a comparison between the one or more predicted actions of the training examples and the one or more corresponding target actions of the training examples. The method further comprises performing validation of the video game environment, comprising controlling the video game entity in the video game environment using the trained agent.

In some implementations, performing validation of the video game environment comprises providing, by the user, one or more corrected demonstrations in response to the agent controlling the video game entity in the video game environment using the updated neural network. The agent may be further trained to control the video game entity using the one or more training examples and one or more corrected training examples generated from the one or more corrected demonstrations, comprising further updating parameters of the neural network.

In some implementations, performing validation of the video game environment comprises providing, by the user, a modification to the video game environment. One or more corrected demonstrations may be provided by the user in response to the agent controlling the video game entity in the modified video game environment using the updated neural network. The agent may be further trained to control the video game entity using the one or more training examples and one or more corrected training examples generated from the one or more corrected demonstrations, comprising further updating parameters of the neural network.

In some implementations, the input data derived from a training example comprises: (i) the segmented map of an area of the video game environment comprising the video game entity, (ii) the entity data for the video game entity, and (iii) the entity data for each of one or more other video game entities in the video game environment.

In some implementations, the neural network comprises a segmented map processing portion, an entity data processing portion, and a further entity data processing portion. Processing, using the neural network, input data derived from the training example may comprise: processing the segmented map using the segmented map processing portion to generate a segmented map embedding; processing the entity data for the video game entity using the entity data processing portion to generate an entity embedding; processing, for each of the one or more other video game entities, the entity data for the other video game entity to generate another entity embedding; combining, for each other entity embedding, the other entity embedding with the entity embedding to generate a combined entity embedding; and processing the one or more combined entity embeddings and the segmented map embedding to generate an output representing one or more predicted actions for the training example. Processing the one or more combined entity embeddings and the segmented map embedding to generate the output representing one or more predicted actions for the training example may comprise processing the one or more combined entity embeddings using an attention mechanism of the neural network to generate a single combined embedding; and processing a combination of the single combined embedding and the segmented map embedding using an output portion of the neural network to generate the output. Processing the one or more combined entity embeddings using the attention mechanism of the neural network to generate a single combined embedding may comprise processing the one or more combined entity embeddings using one or more transformer encoder layers of the neural network.

In some implementations, the segmented map of each training example comprises a three-dimensional integer-coded representation of the area of the video game environment comprising the video game entity. The neural network may comprise a segmented map processing portion comprising one or more three-dimensional convolutional neural network layers.

In some implementations, the entity data comprises relative co-ordinate data based on the position of the video game entity in the video game environment and the position of a location corresponding to the goal.

In some implementations, the entity data further comprises attribute information for the video game entity.

In accordance with a second aspect, this specification provides a computing system comprising one or more computing devices. The computing system is configured to receive, from a user, one or more demonstrations of a video game entity interacting with the video game environment to achieve a goal. Each of the demonstrations specify one or more actions performed by the video game entity in the video game environment at each of one or more time steps. The computing system is configured to generate, from the one or more demonstrations, one or more training examples. Each training example is associated with a time step of a demonstration and comprises: (i) a segmented map of an area of the video game environment comprising the video game entity, (ii) entity data for the video game entity, wherein the entity data comprises a representation of a state of the video game entity with respect to the goal, (iii) entity data for each of one or more other video game entities in the video game environment, and (iv) one or more target actions performed by the video game entity for the time step of the training example. The computing system is further configured to train an agent to control the video game entity using a neural network. The training comprises generating, for each training example, one or more predicted actions for the training example by processing, using the neural network, input data derived from the training example. The training further comprises updating parameters of the neural network based on a comparison between the one or more predicted actions of the training examples and the one or more corresponding target actions of the training examples. The computing system is further configured to perform validation of the video game environment, comprising controlling the video game entity in the video game environment using the trained agent.

In some implementations, performing validation of the video game environment comprises providing, by the user, one or more corrected demonstrations in response to the agent controlling the video game entity in the video game environment using the updated neural network. The agent may be further trained to control the video game entity using the one or more training examples and one or more corrected training examples generated from the one or more corrected demonstrations, comprising further updating parameters of the neural network.

In some implementations, performing validation of the video game environment comprises providing, by the user, a modification to the video game environment. One or more corrected demonstrations may be provide by the user in response to the agent controlling the video game entity in the modified video game environment using the updated neural network. The agent may be further trained to control the video game entity using the one or more training examples and one or more corrected training examples generated from the one or more corrected demonstrations, comprising further updating parameters of the neural network.

In some implementations, the input data derived from a training example comprises: (i) the segmented map of an area of the video game environment comprising the video game entity, (ii) the entity data for the video game entity, and (iii) the entity data for each of one or more other video game entities in the video game environment.

In some implementations, the neural network comprises a segmented map processing portion, an entity data processing portion, and a further entity data processing portion. Processing, using the neural network, input data derived from the training example may comprise: processing the segmented map using the segmented map processing portion to generate a segmented map embedding; processing the entity data for the video game entity using the entity data processing portion to generate an entity embedding; processing, for each of the one or more other video game entities, the entity data for the other video game entity to generate another entity embedding; combining, for each other entity embedding, the other entity embedding with the entity embedding to generate a combined entity embedding; and processing the one or more combined entity embeddings and the segmented map embedding to generate an output representing one or more predicted actions for the training example.

In accordance with a third aspect, this specification provides a non-transitory computer-readable medium, which when executed by a processor, cause the processor to: receive, from a user, one or more demonstrations of a video game entity interacting with the video game environment to achieve a goal, each of the demonstrations specifying one or more actions performed by the video game entity in the video game environment at each of one or more time steps; generate, from the one or more demonstrations, one or more training examples, each training example associated with a time step of a demonstration and comprising: (i) a segmented map of an area of the video game environment comprising the video game entity, (ii) entity data for the video game entity, wherein the entity data comprises a representation of a state of the video game entity with respect to the goal, (iii) entity data for each of one or more other video game entities in the video game environment, and (iv) one or more target actions performed by the video game entity for the time step of the training example; train an agent to control the video game entity using a neural network, comprising: generating, for each training example, one or more predicted actions for the training example by processing, using the neural network, input data derived from the training example; and updating parameters of the neural network based on a comparison between the one or more predicted actions of the training examples and the one or more corresponding target actions of the training examples; and perform validation of the video game environment, comprising controlling the video game entity in the video game environment using the trained agent.

In some implementations, performing validation of the video game environment comprises providing, by the user, one or more corrected demonstrations in response to the agent controlling the video game entity in the video game environment using the updated neural network. The agent may be further trained to control the video game entity using the one or more training examples and one or more corrected training examples generated from the one or more corrected demonstrations, comprising further updating parameters of the neural network.

In some implementations, performing validation of the video game environment comprises providing, by the user, a modification to the video game environment. One or more corrected demonstrations may be provided by the user in response to the agent controlling the video game entity in the modified video game environment using the updated neural network. The agent may be further trained to control the video game entity using the one or more training examples and one or more corrected training examples generated from the one or more corrected demonstrations, comprising further updating parameters of the neural network.

In some implementations, the input data derived from a training example comprises: (i) the segmented map of an area of the video game environment comprising the video game entity, (ii) the entity data for the video game entity, and (iii) the entity data for each of one or more other video game entities in the video game environment.

In some implementations, the neural network comprises a segmented map processing portion, an entity data processing portion, and a further entity data processing portion. Processing, using the neural network, input data derived from the training example may comprise: processing the segmented map using the segmented map processing portion to generate a segmented map embedding; processing the entity data for the video game entity using the entity data processing portion to generate an entity embedding; processing, for each of the one or more other video game entities, the entity data for the other video game entity to generate another entity embedding; combining, for each other entity embedding, the other entity embedding with the entity embedding to generate a combined entity embedding; and processing the one or more combined entity embeddings and the segmented map embedding to generate an output representing one or more predicted actions for the training example.

DESCRIPTION

General Definitions

Figure 1:
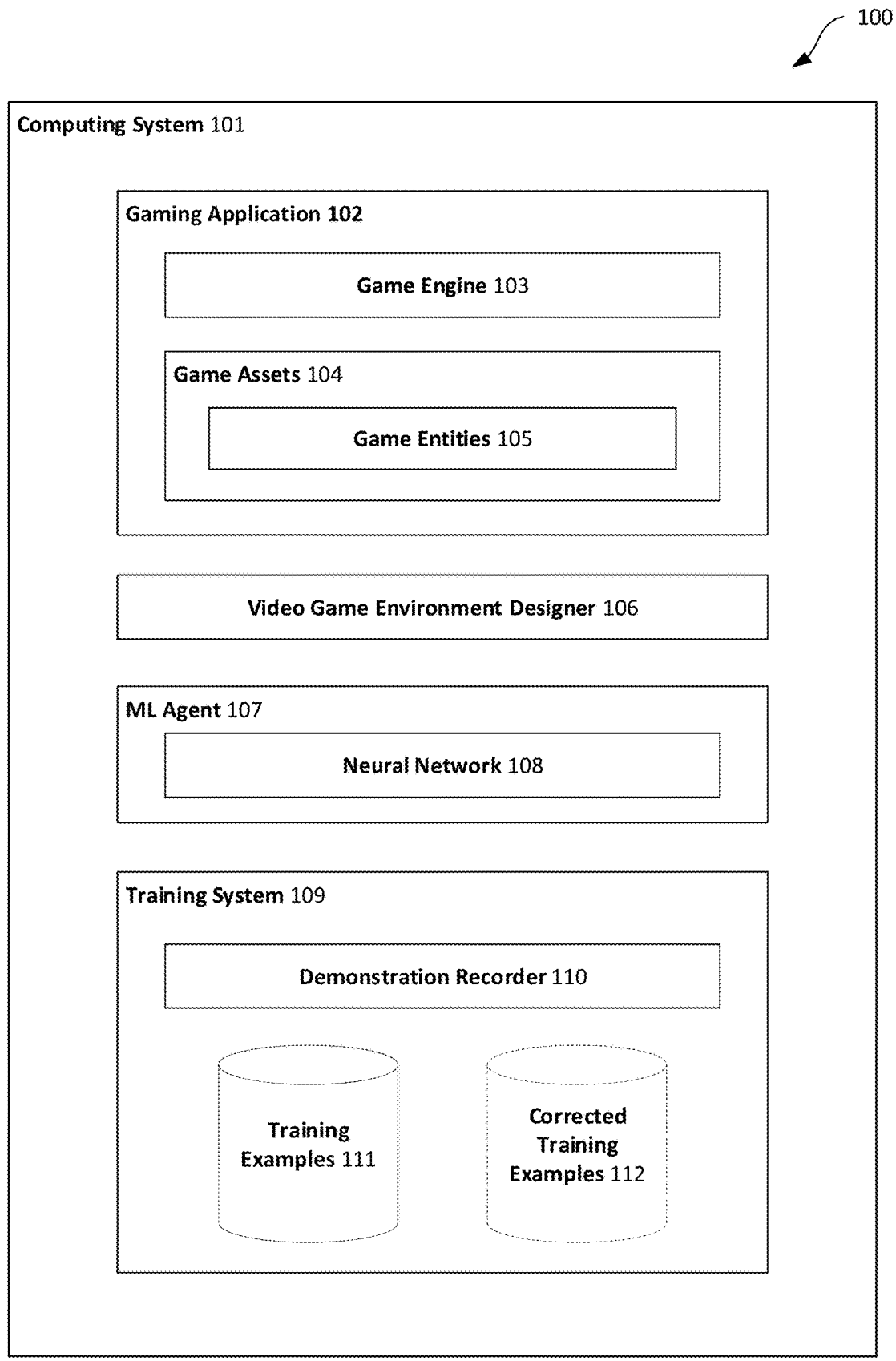
FIG. 1 is a schematic block diagram illustrating an example of a computer system configured to perform automated validation of video game environments.

The following terms are defined to aid the present disclosure and not limit the scope thereof.

A "user" or "player", as used in some embodiments herein, refers to an individual and/or the computing system (s) or device(s) corresponding to (e.g., associated with, operated by) that individual.

A "client", as used in some embodiments described herein, is a software application with which a user interacts, and which can be executed on a computing system or device locally, remotely, or over a cloud service.

A "server", as used in some embodiments described here, is a software application configured to provide certain services to a client, e.g. content and/or functionality.

A "video game", as used in some embodiments described herein, is a virtual interactive environment in which players engage. Video game environments may be facilitated through a client-server framework in which a client may connect with the server to access at least some of the content and functionality of the video game.

A "video game entity", as used in some embodiments described herein, is a video game controllable entity or game asset capable of performing actions, or otherwise interacting, in a video game environment of a video game that may or may not be controlled by a player of the video game and/or may be computer-controlled. A video game entity may include, without limitation, a player character, a player vehicle or other game entity, a non-player character, a non-player vehicle or other game entity and the like and/or any other aspect of a game asset/entity within the video game environment.

This specification describes systems and methods for performing validation of video game environments using a trained neural network. In particular, the systems and methods described herein can be used to efficiently perform automated validation/playtesting of video game environments in an easily accessible manner. For example, the described systems and methods may assist video game designers to validate that, during the design/development phase of the video game, the video game plays as intended. As another example, the described systems and methods may be used in video games where video game environments can be generated or otherwise modified by players of the video game. In this way, player-generated video game environments can easily be validated by players themselves to ensure that their generated video game environment (e.g. levels, maps, etc.) plays as intended.

Existing approaches of performing automated validation are often time-consuming and/or require specialized knowledge by the validators in different domains (e.g. programming, machine learning, etc.). For example, many approaches to performing automated validation/playtesting of video game environments often involve the use of hand-scripted computer-controlled agents and/or the use of reinforcement learning. The resulting computer-controlled agents may be configured to automatically control one or more game entities and/or assets and the like within the video game environment. Hand-scripting computer-controlled agents is time-consuming, requires the user to have programming knowledge, and often these computer-controlled agents do not generalize well to changes in the video game environment. Approaches involving reinforcement learning for generating a computer-controlled agent, which are referred to herein as a machine learning (ML) agent, generally require hours/days of demonstrations to suitably train the ML agent to control video game entities and/or assets in video game environments, require long training times (e.g. days of training) and often require the user to have machine learning knowledge and expertise (e.g. in order to shape reward functions so that the trained ML agent exhibits desired behaviors).

The systems and methods described herein use imitation learning to train ML agents that control video game entities and/or assets in the video game environment. In imitation learning, a number of demonstrations (also referred to herein as trajectories) are provided by a user (e.g. a game designer, a player of the video game, etc.) controlling one or more video game entities, and the ML agent(s) are trained using the demonstrations such that when trained, the ML agent(s) control the video game entity to generally imitate the actions performed by the user in the demonstrations. Demonstrations may be provided by users in the same manner as how players would play the video game (e.g. using the same input and control mechanisms). In this way, automated validation of the video game environment can be performed, e.g. by controlling the video game entity in the video game environment using the trained ML agent(s), without the user requiring specialized knowledge in different domains.

Furthermore, the use of imitation learning to train ML agents in the described systems and methods greatly increases sample efficiency when compared to approaches involving reinforcement learning, reducing the time and amount of data needed to train agents to interact in video game environments from hours/days down to minutes. The reduction in set up time/data requirements by the methods and systems described herein allows automated validation to be used as part of the game design/development process, providing a feedback loop for game designers to iteratively design and validate the video game environment. The reduction in set up time/data requirements also enable the described systems and methods to be provided as part of a video game application for use by players of video games to validate player-generated environments. In addition, ML agents trained using the methods and systems described herein can be easily updated/retrained, e.g. in order to correct mistakes in the behavior of the initially trained ML agent, by the user providing a small number of corrected demonstrations demonstrating the correct behavior. The ML agents trained using the systems and methods described herein can adapt to changes in the video game environment without requiring retraining, or with minimal retraining if needed for major changes to the video game environment.

This provides increased interactivity for game designers when the described systems and methods are used in the game design process.

FIG. 1 is a schematic block diagram illustrating an example 100 of a computing system 101 configured to perform automated validation of video game environments. The computing system 101 is configured to receive one or more demonstrations of a user controlling a video game entity 105 in the video game environment, and to train an ML agent 107 to control the video game entity 105 using training examples 111 generated from the one or more demonstrations. For the sake of clarity, the computing system 101 is illustrated as comprising a specific number of components. Any of the functionality described as being performed by a specific component of the system may instead be performed across a number of components, and/or functionality described as being performed by multiple components may be performed on a single component. For example, one or more of the video game environment designer component 106, ML agent 107 and neural network 108, and training system 109 may be provided as part of the gaming application 102.

The computing system 101 includes gaming application 102 configured to provide a video game. Gaming application 102 includes a game engine 103. The game engine 103 can be configured to execute aspects of the operation of the gaming application 102 according to game rules. Examples of game rules can include rules for scoring, possible inputs, actions/events, movement in response to inputs, and the like. The game engine 103 may receive inputs (provided by a user and/or by other components of the system tot) and determine in-game events, such as actions, jumps, runs, throws, attacks, and other events appropriate for the gaming application 102. During runtime operation, the game engine 103 can read user inputs, in-game data, and game state information to determine the appropriate in-game events.

Furthermore, the game engine 103 is configured to determine the state of a video game environment of the video game as it is being played. For example, in a shooter or action-based adventure video game, the video game environment may be of a particular battlefield or adventure region/area that is being navigated by one or more players and the like. In this example, the state of the video game environment may include the positions of the various video game entities 105 participating in the shooter battlefield or adventure region/area, the status, health, or any other attribute of the video game entities 105, the time in the shooter game or adventure game (e.g. the amount of game time that has elapsed). The game engine 103 may determine the state of the video game environment of the video game continually (e.g. periodically, such as before the rendering of each video frame, multiple frames, etc.). It should be noted that the above-described example of the video game being a shooter or action-based adventure video game is an illustrative example. For example, the video game may be any type of video game in which one or more video game entities may be controlled by the video game such as, without limitation, for example a real-time strategy game; an action-adventure game; survival and/or horror game; a first person and/or third person shooter game; simulation, racing and/or sports game; multiplayer online battle arena (MOBA) game; music game; sandbox and/or simulation game; role-playing game (e.g. RPG, Action RPG, massively multiplayer online RPGs, tactical RPGs and the like, etc.); platformer game; and/or any other type of video game with video game entities controllable using one or more trainable ML agents.

Gaming application 102 includes game assets 104 which contain data/objects that are accessed as the video game is being played. The game assets 104 include game entities 105 in addition to other assets such as image files, audio files, etc. The game entities toy are video game controllable entities or game assets capable of performing actions, or otherwise interacting, in a video game environment of a video game that may or may not be controlled by a player of the video game such as, without limitation, a player character, a player vehicle or other game entity, a non-player character, a non-player vehicle or other game entity and the like and/or any other aspect of a game asset/entity within the video game environment. At least one game entity of the game entities 105 is controllable by ML agent 107.

The computing system 101 includes a video game environment designer component 106 (or video game environment designer 106) that is used for designing the video game environment. The video game environment designer 106 may be an application that can be used by game designers and/or may be a component of the gaming application 102 that can be used/accessed by players of the video game. The video game environment designer 106 configures the game engine 103 and/or game assets 104 based on received user inputs. For example, the user may provide an input to the video game environment designer 106 specifying the configuration of various game assets 104, such as game entities 105, obstacles, goals and intermediate goals for an entity controllable by the ML agent 107 to achieve, and configures the game engine 103 and/or game assets 104 to provide a video game environment in accordance with the user input. As an example, in an action-based adventure video game, the user may use the video game environment designer 106 to design a video game environment specifying the spawn location for a game entity controllable by the ML agent 107, the spawn location of enemy game entities, the layout of the video game environment, the location of dynamic objects, the location of an intermediate goal, the location of a goal and so on.

The computing system 101 includes an ML agent 107 used to control one or more game entities 105. Although for illustrative purposes a single ML agent 107 is illustrated in FIG. 1, it will be appreciated that any number of ML agents 107 may be provided as part of the computing system 101. For example, there may be different ML agents for different game entities 105, different ML agents for different playing styles/personas of the same game entity toy, etc. The ML agent 107 interacts with the video game environment by sending actions/game inputs to game engine 103 for controlling the one or more game entities. The ML agent 107 also obtains data from the game engine 103 and/or game assets 104 for use in generating actions for the one or more game entities 105 to perform. For example, the ML agent 107 can receive representations of the state of the video game environment continually (e.g. periodically, such as before the rendering of each video frame, multiple frames, etc.). As an example, in a shooter video game, the ML agent 107 can continually receive information regarding the location of the one or more game entities 105 being controlled by the ML agent 107, the location of enemy game entities 105, attributes for the one or more ML agent-controlled game entities 105 (e.g. health status, ammunition amount, etc.), the current score of a match being played, and so on, and use this information to generate actions for the ML agent-controlled game entities 105. In this example, the various actions may include moving in various directions, running, jumping, shooting, reloading, and so on, and one or more actions may be generated at the same time.

The ML agent 107 comprises a neural network 108 used to generate actions for the one or more ML agent-controlled game entities 105. An example neural network 108 is described in more detail in relation to FIG. 3. The neural network 108 receives inputs continually (e.g. periodically, such as before the rendering of each video frame, multiple frames, etc.) relating to the current state of the video game environment, and processes the inputs to generate actions for the one or more ML agent-controlled game entities 105 to perform at a particular time step (e.g. a time step immediately following a time step relating to the received inputs). The neural network 108 comprises a plurality of neural network layers, each neural network layer associated with a set of parameters/weights.

The input data for the neural network 108 is provided in the form of vectors, matrices and/or tensors. For example, the ML agent 107 may receive information relating to a current state of the video game environment, and format this information as vectors, matrices, and/or tensors for input to the neural network 108.

Entity data for each of various game entities toy may be formatted as a vector with each element of the vector representing a different feature/characteristic for the current state of the game entity 105. For example, the entity data may comprise a vector representation of the position of the game entity 105 of the video game environment. The positions may be indicated by absolute position (e.g. co-ordinates of the entities with respect to an origin of a co-ordinate system) and/or by relative position (e.g. co-ordinates with respect to a particular entity or goal location of the video game environment). The entity data may comprise a representation of characteristics/attributes for the game entity toy. For example, the characteristics/attributes may include a current status of the game entity toy (e.g. health, ammunition), an indicator indicating whether the game entity 105 has acquired a certain game item, and so on. Additionally, the input data may comprise further data used for generating actions. For example, in the case that the neural network 108 is used to generate actions for a plurality of game entities 105, a selection of a particular game entity toy for which actions are to be generated may be provided in the input data. The input data may comprise indicators of the various game entities 105 of the video game environment and/or their characteristics. The input data may comprise data relating to one or more objects of the video game environment, e.g. the position of a ball in a football video game, or the positions of enemy fighters in a shooter game, or the positions of race participants/entities in a racing game etc.

The input data may comprise a representation of a particular region of the video game environment. For example, the ML agent 107 may be used to control a particular game entity 105 and the input data to the neural network 108 may comprise a representation of a region of the video game environment comprising the ML agent-controlled game entity 105. The representation may be a semantic map of the region comprising a map that is segmented according to the characteristics of different sub-regions in the region. For example, the semantic map may distinguish between obstacles and unobstructed areas by representing unobstructed areas with a particular value, and obstacles with another value. The region represented by the semantic map may be gridded and the semantic map may indicate characteristics of the video game environment at each grid position. The semantic map may be two-dimensional (e.g. for a platformer video game) and the input data to the neural network 108 representing the semantic map may be in the form of a matrix. The matrix may represent subregions of the region that share characteristics/that are of the same type using the same value (e.g. a same integer). Alternatively, the semantic map may be three-dimensional (e.g. for an action-adventure video game) and the input data to the neural network 108 representing the semantic map may be in the form of a tensor. The tensor may represent subregions of the region that share characteristics/that are of the same type using the same value (e.g. a same integer). Any suitable number of different subregion types may be represented in the semantic map.

The computing system 101 includes a training system 109 that is used to train the ML agent 107 to control ML agent-controlled game entities 105. The training system 109 receives one or more demonstrations of a user/player controlling a game entity 105 in the video game environment, generates training examples iii from the one or more user demonstrations, and trains the ML agent 107 by updating parameters of the neural network 108 using the training examples tn. The training of the ML agent 107 is described in greater detail in relation to FIG. 4.

The training system 109 includes a demonstration recorder 110 which records demonstrations of a user controlling a game entity 105 using data obtained from the game engine 103 and/or game assets 104. Users can provide demonstrations of controlling game entities 105 in the same manner as players would control game entities 105, e.g. by using the same input and control mechanisms. During each demonstration provided by the user, the demonstration recorder 110 continually (e.g. periodically, such as before the rendering of each video frame, multiple frames, etc.) obtains data relating to the state of the video game environment at the current time step and associates this with actions performed by the user at a subsequent time step (e.g. the time step immediately following the current time step).

The data relating to the state of the video game environment at the current time step is used to form a training input of a training example iii and the actions performed by the user at the subsequent time step is used to form the target output for the training example tn. The demonstration recorder 110 may process the data relating to the state of the video game environment at the current time step to form a training input that is suitable for input and subsequent processing by the neural network 108. Similarly, the demonstration recorder 110 may process the action(s) performed by the user at the subsequent time step to form a target output that is suitable for training the neural network 108.

When obtaining data relating to the state of the video game environment at the current time step, the demonstration recorder no obtains data about the game entity 105 being controlled by the user, in addition to data about other game entities 105 in the video game environment. For example, the demonstration recorder 110 may obtain data about other game entities 105 based on proximity to the game entity 105 being controlled by the user, e.g. for any game entity 105 within a certain radius of the user-controlled game entity 105, and/or for a number of the closest game entities 105 to the user-controlled game entity 105 at the current time step. Additionally or alternatively, particular game entities 105 may be specified for which data should be obtained by the demonstration recorder 110. The demonstration recorder 110 may process the obtained data to generate entity data for the user-controlled game entity 105 and the other game entities 105. The entity data may specify the location of the game entity 105, e.g. by absolute position or relative position with respect to a goal location, and any other attribute/characteristic of the game entity 105 (e.g.

health, status, etc.). The entity data for each of the user-controlled game entity 105 and the other game entities 105 may be used to form the training input of a training example 111.

When obtaining data relating to the state of the video game environment at the current time step, the demonstration recorder 110 may also obtain data about a region of the video game environment comprising the user-controlled game entity 105. For example, the region of the video game environment may be gridded and the demonstration recorder no may obtain data about the characteristics of the video game environment at each grid position. The demonstration recorder 110 may process the obtained data to generate a segmented map for the region, wherein the map is segmented according to the characteristics of subregions, e.g. at each grid position. Such a segmented map may be referred to as a semantic map, as the map encodes information about the region. The segmented map may be integer-encoded, e.g. a different integer may represent a different characteristic of subregions. The demonstration recorder 110 may configure the size, shape, resolution, etc. of the region of the video game environment represented by the segmented map. The segmented map may also be used to form the training input of the training example 111.

The demonstration recorder 110 may record demonstrations of the user controlling different game entities 105 and/or record demonstrations of the user controlling the same game entity 105 in different playstyles/personas (e.g. aggressive, defensive, etc.). The training input of training examples 111 may indicate which game entity 105 the user was controlling for the training example 111. Additionally or alternatively, the training input of training examples 111 may indicate the playstyle/persona in which the 105 the user was controlling the game entity 105 for the training example 111.

After training the ML agent 107 by updating parameters of the neural network 108 using one or more training examples 111, validation of the video game environment is performed using the trained ML agent 107. The trained ML agent 107 controls one or more game entities 105 for which it was trained to control by continually processing inputs relating to the current state of the video game environment and generating actions for the one or more ML agent-controlled game entities 105 to perform in a subsequent time step. The user may direct the trained ML agent 107 to control the one or more ML agent-controlled game entities 105 to achieve one or more goals or subgoals within the video game environment. The one or more ML agent controlled game entities 105 may be placed anywhere within the video game environment and the trained ML agent 107 is configured to control the one or more ML agent-controlled game entities 105 to achieve one or more goals or subgoals. The behavior of the ML agent-controlled game entities 105 in the video game environment can be automatically monitored or otherwise observed by the user to validate that the video game plays as intended. For example, the computing system 101 may automatically validate the video game environment by determining whether any errors (e.g. as determined by the game engine 103) were generated as the ML agent-controlled game entities 105 interact in the video game environment. Trajectories of actions performed by the ML agent-controlled game entities 105 leading to errors may be surfaced to the user (e.g. by replay/visualization of the actions performed by the ML agent-controlled entity 105 in the trajectory), enabling the user to easily assess any mistakes/bugs (e.g. an ML agent-controlled game entity 105 moving through a wall or unseen gap in the video game environment) in the design of the video game environment.

As another example, if a goal (or subgoal) has not been achieved by the ML agent-controlled game entities 105 in a trajectory within a threshold amount of time, the trajectory of the actions performed by the ML agent-controlled game entities 105 may be surfaced to the user. As another example, the user can observe the behavior of ML agent-controlled game entities 105 as they interact with the video game environment in real-time.

The user may provide one or more corrected demonstrations in response to the validation, which may be used to update/retrain the trained ML agent 107. Alternatively or additionally, the user may make changes using the video game environment designer 106 to the video game environment in response to the validation, where the user identifies mistakes/bugs experienced by an ML agent-controlled game entity 105 within the design of the video game environment. For example, it may be determined that ML agent-controlled game entities 105 face difficulty in navigating a certain region of the video game environment. The user may then provide corrected demonstrations of the user controlling the game entity 105 in the region which are recorded by the demonstration recorder 110 to generate one or more corrected training examples 112. As another example, the user may further modify the video game environment using the video game environment designer 106 in response to identifying mistakes/bugs/errors within the video game environment based on the difficulties faced by an ML agent-controlled game entity 105 navigating or interacting within the certain region of the video game environment. As a further example, the user may modify the video game environment using the video game environment designer 106 such that the video game environment is different to the one that the ML agent 107 was initially trained to interact within. In some cases (e.g. for minor changes to the video game environment) the ML agent 107 may generalize well enough to interact successfully (e.g. to achieve a certain goal) within the modified video game environment, thus requiring no retraining of the ML agent 107. In other cases, the ML agent 107 may benefit from retraining using corrected demonstrations of the user controlling the game entities 105 in the modified video game environment. Similarly, corrected training examples 112 can be generated from the corrected demonstrations in the modified video game environment.

Corrected training examples 112 can be used in addition to the initial training examples in for further training the ML agent 107, allowing users to easily modify the behavior of ML agent-controlled game entities 105 by providing a small number of corrected demonstrations.

Figure 2:
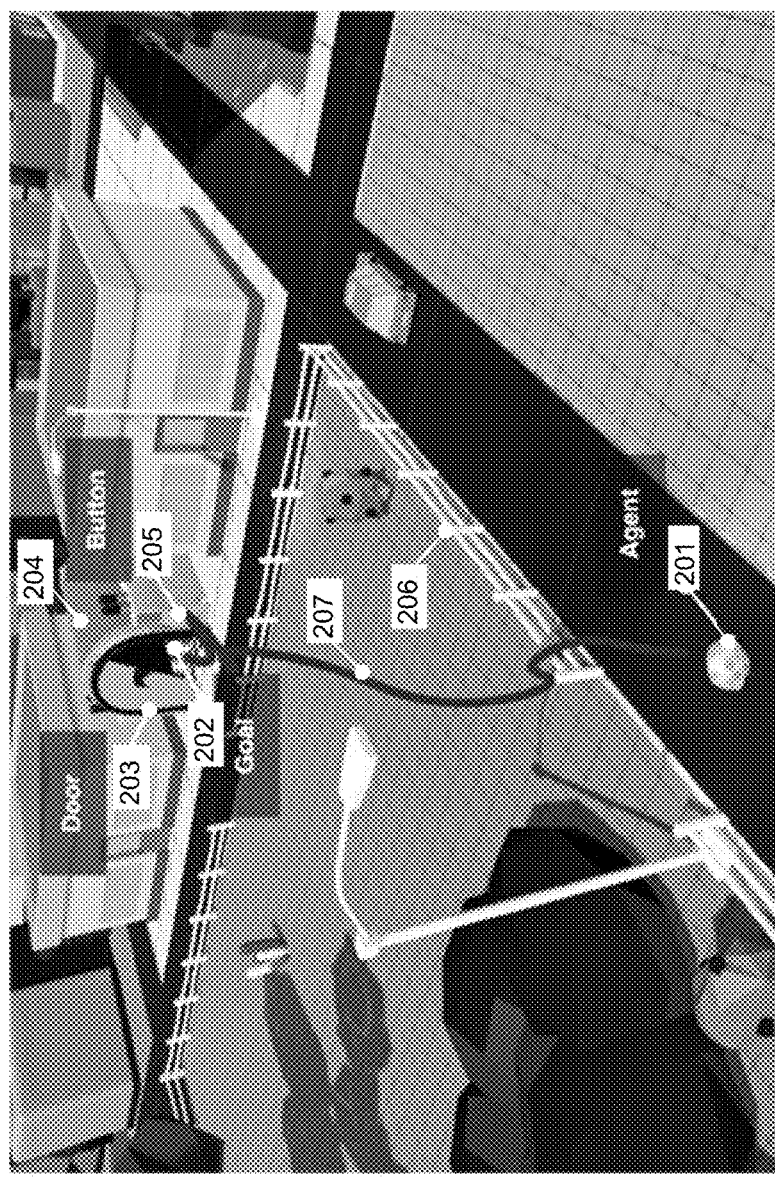
FIG. 2 illustrates an example video game environment.

FIG. 2 illustrates an example video game environment 200. As shown in the example video game environment 200, an agent is controlling a video game entity 201 to interact in the video game environment 200 to reach a goal location 202. In this example, the agent is a computer-controlled agent such as an ML agent and is configured and/or trained based on the imitation learning techniques, methods and/or processes as described with reference to FIGS. 1 and/or FIGS. 3 to 5. The goal location 202 being behind a closed door 203 of a round roofed building 204 that may be opened via a button 205. In this example, navigating to the goal location 202 requires avoiding obstacles (e.g. the fences 206), reaching the location of the button 205, and interacting with the button 205 to open the door 203 so that the game entity 201 can reach the goal location 202 behind the door 203 of the round roofed building 204. The trajectory of the game entity 201 controlled by the ML agent is illustrated as the dark path 207 from the game entity 201 to the goal location 202.

As the ML agent controls the game entity 201 to interact in the video game environment 200, the ML agent continually obtains information about the current state of the video game environment 200. This includes the position of the ML agent-controlled game entity 201 in the video game environment 200, and the position of other game entities or assets such as, without limitation, for example the button 205 and the door 203 and/or round roofed building 204. Positions of game entities may be represented in absolute terms, e.g. the absolute position of the game entity 201 within the video game environment 200, or in relative terms, e.g. the relative position of the game entity 201 with respect to the goal position. Other attributes of the ML agent-controlled game entity 201 may also be obtained, e.g. an indication as to whether the game entity 201 is grounded, whether it can jump, etc. Other attributes for the other game entities may also be obtained, e.g. an indication as to whether the button 205 has been pressed or not. The obtained information also includes a semantic representation of a region of the video game environment 200 comprising the ML agent-controlled game entity 201. The obtained information is processed by the ML agent to generate an action for controlling the game entity 201 to perform in a subsequent time step. In this example, a generated action may to be move in a certain direction, to run, to jump, or to press the button 205.

It will be appreciated that FIG. 2 illustrates just one example of a video game environment 200, and that the systems and methods described herein can be used to perform automated validation of any suitable video game. Furthermore, while FIG. 2 depicts a goal 202 as a particular location or building 204 in the video game environment for the ML agent-controlled game entity 201 to reach, it will be appreciated that a goal may be defined as any suitable state of the video game environment. For example, in a shooter video game, a goal for an ML agent-controlled game entity to achieve may be to shoot an enemy game entity. In a sports video game, a goal for an ML agent-controlled game entity to achieve may be to win a match. The goal may be a timed goal, i.e. the ML agent-controlled game entity 201 may be required to reach the goal or achieve the goal within a period of time or within a minimum time.

Figure 3:
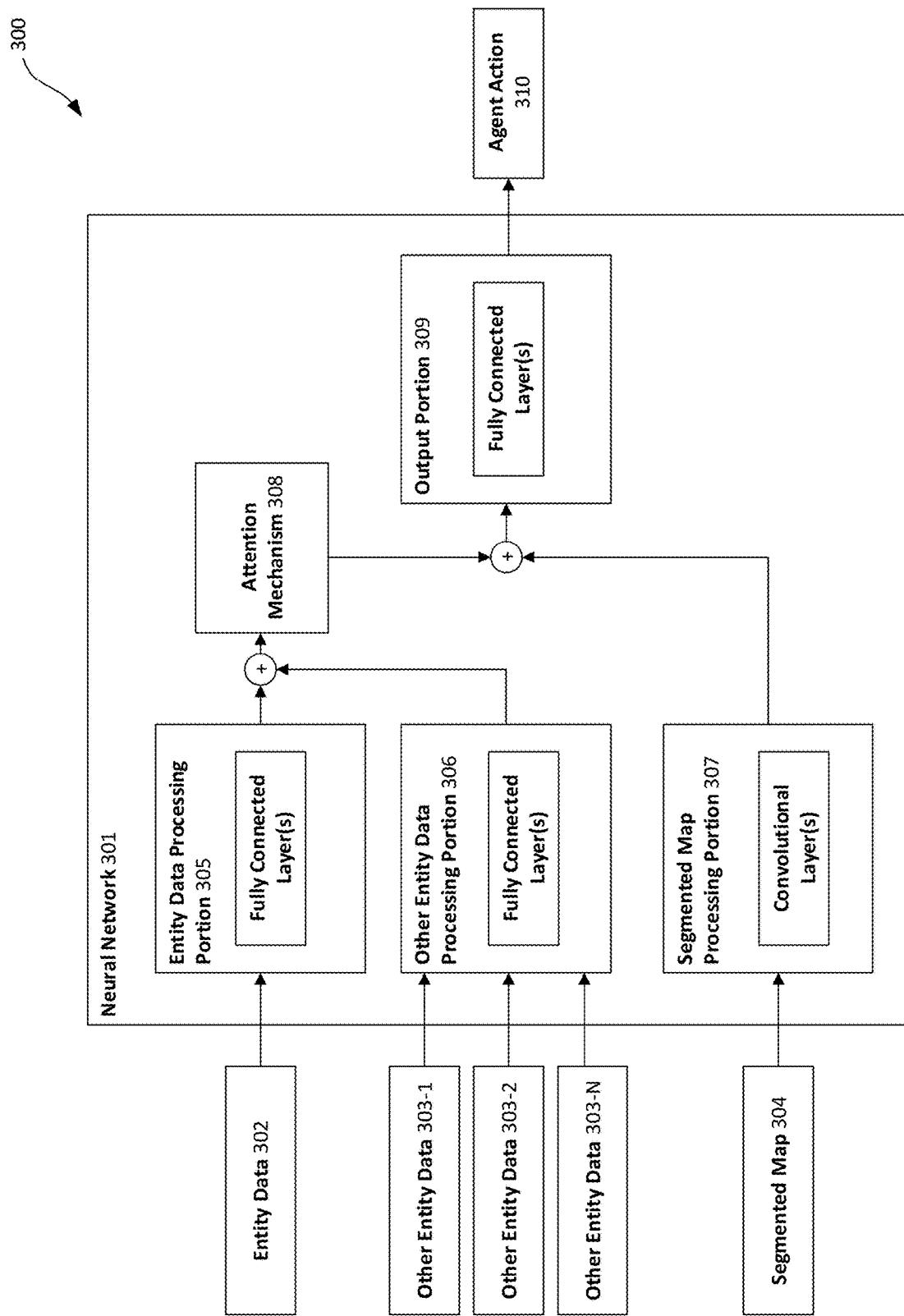
FIG. 3 is a schematic block diagram illustrating an example of a neural network for performing automated validation of video game environments.

FIG. 3 is a schematic block diagram illustrating an example 300 of a neural network 301 for a computer-controlled agent such as an ML agent when used in performing automated playtesting/validation of video game environments.

The neural network 301 receives an input comprising entity data 302 for a game entity controllable by the ML agent, entity data 303-1, 303-2, 303-N for N other game entities, and a segmented map 304. The input reflects the state of the video game environment at a particular time.

The entity data 302 for the ML agent-controllable game entity comprises a representation of a state of the ML agent-controllable game entity with respect to the goal. For example, a goal for the ML agent-controllable game entity to achieve may be to reach a goal location in the video game environment. In this example, the entity data 302 may comprise a representation of the position of the ML agent-controllable game entity with respect to the goal location. For example, the entity data 302 may specify the relative position of the ML agent-controllable game entity in relation to the goal location. This may be achieved by performing one or more projections of the position vector between the position of the ML agent-controllable game entity and the goal location onto respective planes. For example, the position vector may be projected into the XY-plane and the XZ-plane, e.g. if the video game environment is a three-dimensional environment. The lengths of the projected vectors may be normalized, e.g. based on the area of the video game environment, and the normalized lengths may be used to specify the relative position in the entity data 302. Entity data 303-1, 303-2, 303-N for other game entities may also each specify the relative position of the respective game entity with respect to the goal location in a similar manner. For other kinds of goals, the entity data 302 may comprise an indicator indicating whether the goal has been achieved to represent the state of the ML agent-controllable game entity with respect to the goal. More generally, any suitable state of the video game environment may be a goal for the ML agent-controllable game entity to achieve (e.g. to shoot an enemy in a shooter video game, to score a goal in a sports video game, etc.).

The entity data 302 may further comprise non-goal related information/attributes about the agent-controllable game entity. For example, the entity data 302 may specify whether the game entity has possession of particular game item(s) (e.g. a key if needed to unlock a door), a status of the game entity (e.g. if the game entity is grounded, if the game entity can jump, a health status, etc.), a position of the game entity in the video game environment, and any other data which may be relevant for gameplay. The entity data 302 may comprise an indication of a particular playstyle/persona corresponding to a desired playstyle/persona for the agent-controllable game entity. The entity data 302 may be represented as a vector.

The input to the neural network 301 comprises entity data 303-1, 303-2, 303-N for N other game entities. The other game entities are game entities that may be useful for the ML agent to be aware of when controlling the agent-controllable game entity. The other game entities may include intermediate goals, dynamic objects, enemies, and other game entities that could be used for achieving the final goal. The number of other game entities, N, for which entity data 303 is received may differ between different inputs to the neural network 301. In other words, the neural network 301 may be configured to process entity data 303 associated with a variable number of other game entities. The entity data 303 comprises information/attributes about the game entity. For example, the entity data 303 may specify a status of the game entity (e.g. if the game entity is grounded, if the game entity can jump, a health status, etc.), a position of the game entity in the video game environment, and any other data which may be relevant for gameplay. As mentioned above, the entity data 303-1, 303-2, 303-N may each specify the relative position of the respective game entity with respect to a goal location. Each of the entity data 303 may be represented as a vector.

The segmented map 304 is a representation of an area/region of the video game environment comprising the ML agent-controllable game entity. The segmented map 304 is segmented according to the characteristics of subregions of the region. Such a segmented map may be referred to as a semantic map, as the map encodes information about the region. The segmented map may be integer-encoded, e.g. a different integer may represent a different characteristic of subregions. For example, the segmented map 304 may distinguish between obstacles and unobstructed areas by representing unobstructed areas with a particular value, and obstacles with another value. The region represented by the segmented map 304 may be gridded and the segmented map 304 may indicate characteristics of the video game environment at each grid position. The segmented map 304 may be two-dimensional (e.g. for a platformer video game) and the segmented map 304 may be represented as a matrix. The matrix may represent subregions of the region that share characteristics/that are of the same type using the same value (e.g. a same integer). Alternatively, the segmented map 304 may be three-dimensional (e.g. for an action-adventure video game) and the segmented map 304 may be represented as a tensor. The tensor may represent subregions of the region that share characteristics/that are of the same type using the same value (e.g. a same integer). Any suitable number of different subregion types may be represented in the segmented map 304.

The neural network 301 comprises an entity data processing portion 305 configured to process entity data 302 associated with the ML agent-controllable game entity. The entity data processing portion 305 comprises one or more neural network layers, each neural network layer associated with a set of parameters/weights. As depicted in FIG. 3, the entity data processing portion 305 comprises one or more fully connected layers. The entity data processing portion 305 may comprise additional neural network layers, such as convolutional layers, Transformer layers, etc. The entity data processing portion 305 processes the entity data 302 in accordance with the neural network layers and respective parameters, and produces a vector/embedding representing the entity data 302.

The neural network 301 comprises an "other entity" data processing portion 306 configured to process entity data 303 associated with other game entities. The other entity data processing portion 306 comprises one or more neural network layers, each neural network layer associated with a set of parameters/weights. As depicted in FIG. 3, the other entity data processing portion 306 comprises one or more fully connected layers. The other entity data processing portion 306 may comprise additional neural network layers, such as convolutional layers, Transformer layers, etc. The other entity data processing portion 306 processes each entity data 303 in accordance with the neural network layers and respective parameters, and produces a respective vector/embedding representing the corresponding entity data 303. The other entity data processing portion 306 may process the entity data 303-1, 303-2, 303-N at the same time, e.g. by forming a matrix from the entity data 303-1, 303-2, 303-N and processing the matrix. The other entity data processing portion 306 may process the entity data 303 in parallel with the entity data processing portion 305 processing the entity data 302.

The neural network 301 comprises a segmented map processing portion 307 configured to process segmented maps 304. The segmented map processing portion 307 comprises one or more neural network layers, each neural network layer associated with a set of parameters/weights. As depicted in FIG. 3, the segmented map processing portion 307 comprises one or more convolutional layers. The convolutional layer(s) may be configured to perform 3D convolution and/or 2D convolution, e.g. depending on the whether the segmented map 304 is three-dimensional or two-dimensional. The segmented map processing portion 307 may comprise additional neural network layers, such as fully connected layers, pooling layers, Transformer layers, etc. The segmented map processing portion 307 processes the segmented map 304 in accordance with the neural network layers and respective parameters, and produces a vector/embedding representing the segmented map 304. The segmented map processing portion 307 may process the segmented map 304 in parallel with the entity data processing portion 305 processing the entity data 302 and the other entity data processing portion 306 processing the entity data 303.

The neural network 301 comprises an attention mechanism 308. The attention mechanism 308 receives inputs formed from combining vectors/embeddings produced by the entity data processing portion 305 with vectors/embeddings produced by the other entity data processing portion 306. For example, N combined entity embeddings may be produced from combining the entity embedding produced by the entity data processing portion 305 with each of the N other entity embeddings produced by the other entity data processing portion 306. Any suitable combining operation may be used to form the combined entity embeddings, e.g. concatenation, addition, etc. The attention mechanism 308 comprises one or more neural network layers, e.g. fully-connected layers, Transformer layers (e.g. Transformer encoder blocks), pooling layers etc. The attention mechanism 308 is configured to process the N combined entity embeddings to produce a single combined embedding representing the N combined entity embeddings.

The neural network 301 comprises an output portion 309. The output portion 309 is configured to receive an input formed from combining the single combined embedding produced by the attention mechanism 308 with the segmented map embedding produced by the segmented map processing portion 307. Any suitable combining operation may be used, e.g. concatenation, addition, etc. The output portion 309 comprises one or more neural network layers, each neural network layer associated with a set of parameters/weights. As depicted in FIG. 3, the output portion 309 comprises one or more fully connected layers. The output portion 309 may comprise additional neural network layers, such as convolutional layers, pooling layers, Transformer layers etc. The output portion 309 processes the input formed from combining the single combined embedding with the segmented map embedding and produces an output from which an ML agent action 310 (or actions) can be obtained.

The output generated by the output portion 309 may be a vector of scores/probabilities for various one or more actions that the ML agent-controllable game entity can perform. The vector may specify a score for each of a plurality of discrete actions. For example, a score for a move left action, a score for a move forward action, a score for a jump action etc. One or more ML agent actions 310 may be selected based on the output scores, for example the highest-scoring action(s) may be selected as the ML agent action 310. It may be possible for the ML agent-controllable game entity to perform multiple actions at the same time (e.g. move right and jump), and multiple actions may be selected as the ML agent action 310 based on the output scores. For example, if the scores for two actions capable of being performed at the same time or concurrently are each greater than a threshold value, the two actions may be selected as the ML agent action 310. Although an ML agent action 310 may include two or more actions that are to be performed by the ML agent-controllable game entity, the two or more actions may be performed by the ML agent-controllable game entity simultaneously, serially, concurrently and/or at least partially concurrently prior to the ML agent receiving further input for generating a further ML agent action 310. For example, once the ML agent action 310 is output with two or more actions, each of the two or more actions of the ML agent action 310 may be performable by the ML agent-controllable game entity at the same or different time instances to other of the two or more actions and complete at the same or different time instances of the other of the two or more actions, as well, when performed simultaneously, concurrently or at least partially concurrently, the two or more actions may overlap in time.

Figure 4:
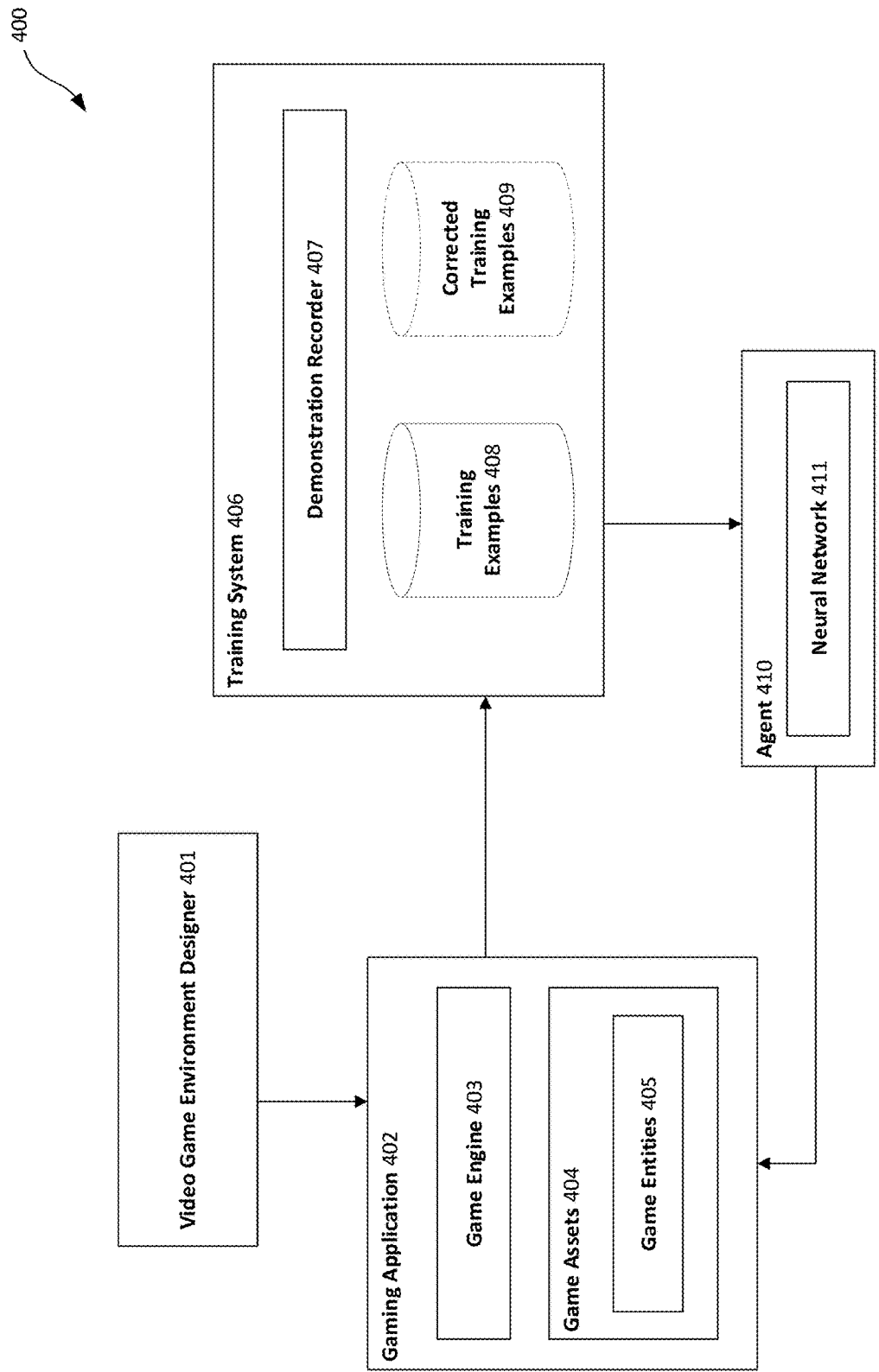
FIG. 4 illustrates an example method of performing automated validation of video game environments.

FIG. 4 illustrates an example method 400 of performing automated playtesting of video game environments. FIG. 4 refers to various components of the system 101 described in relation to FIG. 1.

Video game environment designer 401 used for designing the video game environment. The video game environment designer component 401 may be an application that can be used by game designers and/or may be a component of the gaming application 402 that can be used/accessed by players of the video game. The video game environment designer component 401 configures the game engine 403 and/or game assets 404 based on received user inputs.

The training system 406 receives one or more demonstrations of a user/player controlling a game entity 405 in the video game environment, generates training examples 408 from the one or more user demonstrations, and trains an agent 410 by updating parameters of the neural network 411 of the agent 410 using the training examples 408. As an example, the neural network 411 may be based on the neural network 301 described with reference to FIG. 3. The agent 410 may be a computer-controlled agent such as an ML agent and the like.

During each demonstration provided by the user, the demonstration recorder 407 continually (e.g. periodically, such as before the rendering of each video frame, multiple frames, etc.) obtains data relating to the state of the video game environment at the current time step and associates this with actions performed by the user at a subsequent time step (e.g. the time step immediately following the current time step).

The data relating to the state of the video game environment at the current time step is used to form a training input of a training example 408 and the actions performed by the user at the subsequent time step is used to form the target output for the training example 408. The demonstration recorder 407 may process the data relating to the state of the video game environment at the current time step to form a training input that is suitable for input and subsequent processing by the neural network 411. Similarly, the demonstration recorder 407 may process the action(s) performed by the user at the subsequent time step to form a target output that is suitable for training the neural network 411. For example, the target output may be represented as a vector indicating the action(s) performed by the user at the subsequent time step(s).

For each training example 408, the neural network 411 of the agent 410 processes the training input of the training example 408 and produces a training output. The training output represents a prediction for which action(s) the agent 410 should perform in the state of the video game environment corresponding to the training input. The training system 406 trains the neural network 411 of the agent 410 by updating parameters of the neural network 411 to optimize an objective function. For example, the training system 406 may update parameters of the neural network 411 to optimize a cross-entropy loss function, a least-squares loss function, or any other suitable loss function and combinations thereof. In general, updating parameters of the neural network 411 to optimize an objective function minimizes differences (or errors) between training outputs generated by the neural network 411 from processing training examples 408 and the corresponding target outputs of the training examples 408. The parameters of the neural network 411 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

After training the agent 410 by updating parameters of the neural network 411 using one or more training examples 408, validation of the video game environment is performed using the trained agent 410. The trained agent 410 controls one or more game entities 405 for which it was trained to control by continually processing inputs relating to the current state of the video game environment and generating actions for the one or more agent-controlled game entities 405 to perform in a subsequent time step for use in controlling the one or more agent-controlled game entities 405 in achieving their corresponding goals. The behavior of the agent-controlled game entities 405 in the video game environment can be automatically monitored or otherwise observed by the user to validate that the video game plays as intended. For example, the computing system 101 may automatically validate the video game environment by determining whether any errors (e.g. as determined by the game engine 403) were generated as the agent-controlled game entities 405 interact in the video game environment. Trajectories of actions performed by the agent-controlled game entities 405 leading to errors may be surfaced to the user (e.g. by replay/visualization of the actions performed by the agent-controlled entity 405 in the trajectory), enabling the user to easily assess any mistakes/bugs in the design of the video game environment. As another example, if a goal has not been achieved by the agent-controlled game entities 405 in a trajectory within a threshold amount of time, the trajectory of the actions performed by the agent-controlled game entities 405 may be surfaced to the user. As another example, the user can observe the behavior of agent-controlled game entities 405 as they interact with the video game environment in real-time.

The user may provide one or more corrected demonstrations in response to the validation. For example, it may be determined that agent-controlled game entities 405 face difficulty in navigating a certain region of the video game environment. The user may then provide corrected demonstrations of the user controlling the game entity 405 in the region which are recorded by the demonstration recorder 407 to generate one or more corrected training examples 409. As another example, the user may modify the video game environment using the video game environment designer 401 such that the video game environment is different to the one that the agent 410 was initially trained to interact within. In some cases (e.g. for minor changes to the video game environment) the agent 410 may generalize well enough to interact successfully (e.g. to achieve a certain goal) within the modified video game environment, thus requiring no retraining of the agent 410. In other cases, the agent 410 may benefit from retraining using corrected demonstrations of the user controlling the game entities 405 in the modified video game environment. Similarly, corrected training examples 409 can be generated from the corrected demonstrations in the modified video game environment. In this way, the corrected training examples may be used to correct mistakes in the behavior of the initially trained agent.

Corrected training examples 409 can be used in addition to the initial training examples 408 to further train the agent 410 using a similar process to the initial training process described above, allowing users to easily modify the behavior of agent-controlled game entities 405 by providing a small number of corrected demonstrations. For example, the training examples 408 and corrected training examples 409 may be aggregated to form an aggregated training set, and the training examples of the aggregated training set may be used to further update the parameters of the neural network 411 when updating the agent 410.

Figure 5:
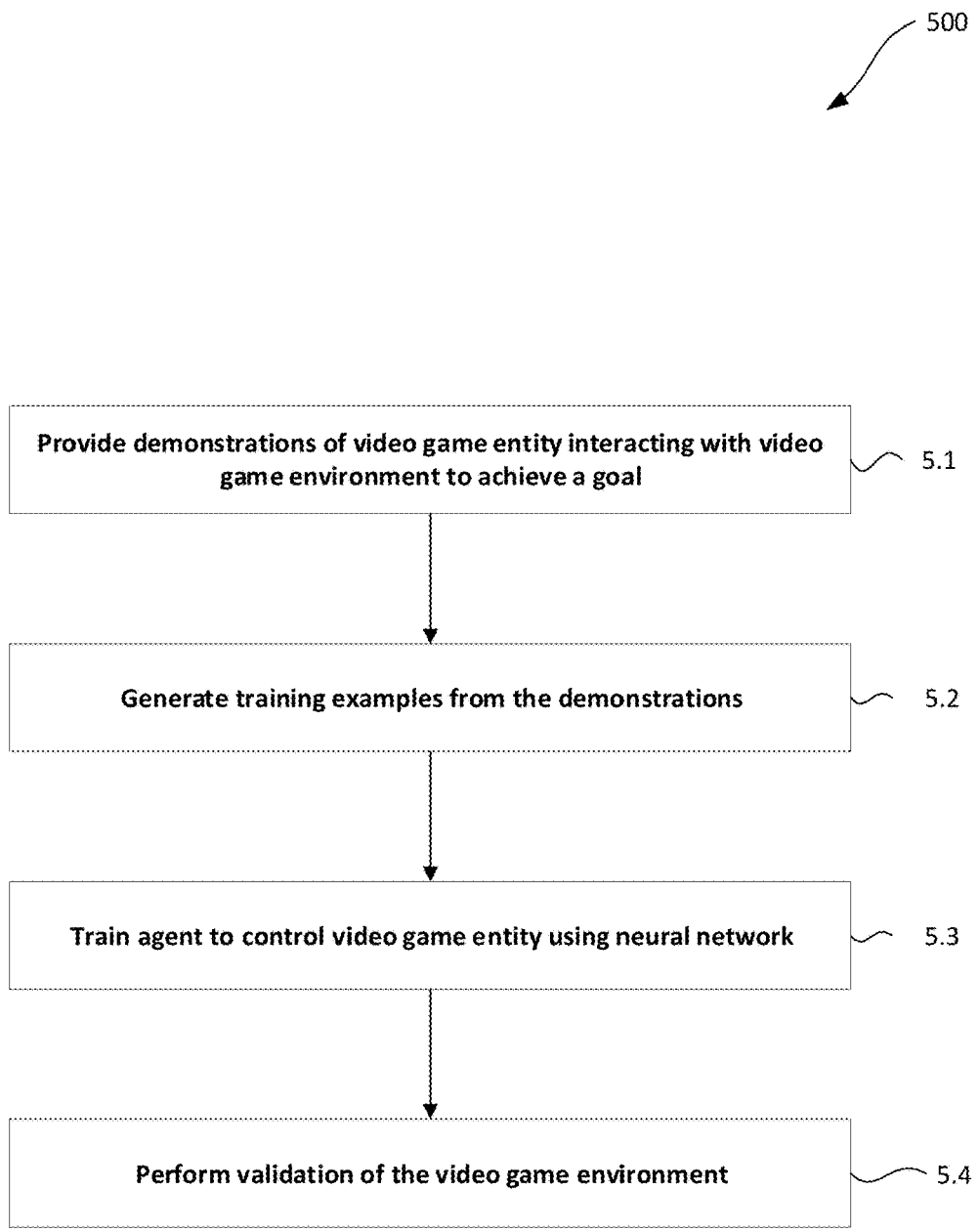
FIG. 5 is a flow diagram illustrating an example method for performing validation of a video game environment.

FIG. 5 is a flow diagram illustrating an example method 500 for performing validation of a video game environment.

In step 5.1, one or more demonstrations of a video game entity interacting with the video game environment to achieve a goal are provided by a user. Each of the demonstrations specify one or more actions performed by the video game entity in the video game environment at each of one or more time steps.

In step 5.2, one or more training examples are generated from the one or more demonstrations. Each training example is associated with a time step of a demonstration and comprises: (i) a segmented map of an area of the video game environment comprising the video game entity, (ii) entity data for the video game entity, wherein the entity data comprises a representation of a state of the video game entity with respect to the goal, (iii) entity data for each of one or more other video game entities in the video game environment, and (iv) one or more target actions performed by the video game entity for the time step of the training example. The segmented map and entity data represent a state of the video game environment at a time step prior to the time step at which the target actions were performed by the video game entity. The entity data may comprise relative coordinate data based on the position of the video game entity in the video game environment and the position of a location corresponding to the goal. The entity data may further comprise attribute information for the video game entity.

In step 5.3, an agent is trained to control the video game entity using a neural network. The agent may be a computer-controlled agent such as a ML agent (e.g. a computer-controlled agent including ML functionality configured for training and learning to operate/control one or more game entities autonomously without input from a user). For each training example, one or more predicted actions for the training example are generated by processing, using the neural network, input data derived from the training example. Parameters of the neural network are updated based on a comparison between the one or more predicted actions of the training examples and the one or more corresponding target actions of the training examples.

The neural network may comprise a segmented map processing portion, an entity data processing portion, and a further entity data processing portion. Processing, using the neural network, input data derived from the training example may comprise: processing the segmented map using the segmented map processing portion to generate a segmented map embedding; processing the entity data for the video game entity using the entity data processing portion to generate an entity embedding; processing, for each of the one or more other video game entities, the entity data for the other video game entity to generate another entity embedding; combining, for each other entity embedding, the other entity embedding with the entity embedding to generate a combined entity embedding; and processing the one or more combined entity embeddings and the segmented map embedding to generate an output representing one or more predicted actions for the training example.

Processing the one or more combined entity embeddings and the segmented map embedding to generate the output representing one or more predicted actions for the training example may comprise: processing the one or more combined entity embeddings using an attention mechanism of the neural network to generate a single combined embedding; and processing a combination of the single combined embedding and the segmented map embedding using an output portion of the neural network to generate the output.

Processing the one or more combined entity embeddings using the attention mechanism of the neural network to generate a single combined embedding may comprise processing the one or more combined entity embeddings using one or more Transformer encoder layers of the neural network. For example, the attention mechanism may comprise one or more Transformer encoder blocks. Each of the Transformer encoder blocks may be configured to perform multi-head self-attention on sequences derived from the one or more combined entity embeddings.

The input data derived from a training example may comprise: (i) the segmented map of an area of the video game environment comprising the video game entity, (ii) the entity data for the video game entity, and (iii) the entity data for each of one or more other video game entities in the video game environment.

The segmented map of each training example may comprise a three-dimensional integer-coded representation of the area of the video game environment comprising the video game entity. The neural network may comprise a segmented map processing portion comprising one or more three-dimensional convolutional neural network layers.

In step 5.4, validation of the video game environment is performed. This comprises controlling the video game entity in the video game environment using the trained agent. Performing validation of the video game environment may comprise providing, by the user, one or more corrected demonstrations in response to the agent controlling the video game entity in the video game environment using the updated neural network. The agent may be further trained to control the video game entity using the one or more training examples and one or more corrected training examples generated from the one or more corrected demonstrations. This may comprise further updating parameters of the neural network.

Performing validation of the video game environment may comprise providing, by the user, a modification to the video game environment. One or more corrected demonstrations may be provided by the user in response to the agent controlling the video game entity in the modified video game environment using the updated neural network. The agent may be further trained to control the video game entity using the one or more training examples and one or more corrected training examples generated from the one or more corrected demonstrations, comprising further updating parameters of the neural network.

Figure 6:
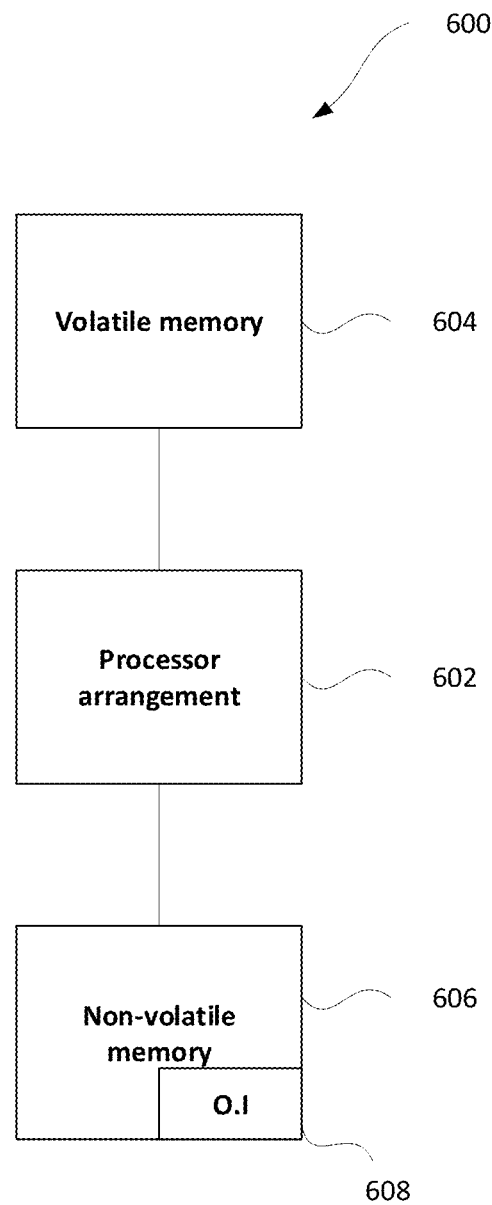
FIG. 6 shows a schematic example of a system/apparatus for performing any of the methods described herein.

FIG. 6 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 600 comprises one or more processors 602. The one or more processors control operation of other components of the system/apparatus 600. The one or more processors 602 may, for example, comprise a general purpose processor. The one or more processors 602 may be a single core device or a multiple core device. The one or more processors 602 may comprise a central processing unit (CPU) or a graphical processing unit (GPU).

Alternatively, the one or more processors 602 may comprise specialised processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to temporarily store data generated during execution of said operating instructions 608.

Implementations of the methods, apparatus and/or systems as described herein may be realised as in digital electronic circuitry, integrated circuitry, specially designed ASICs (application specific integrated circuits), system-on-chip (SoC) integrated circuitry, computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Implementations of the methods, apparatus and/or systems as described herein may be realised as one or more servers, a plurality of servers and/or computing devices, a distributed system, a cloud-based platform and/or cloud computing system and the like. Thus, for instance, several computing devices and/or servers may be in communication by way of a network connection and may collectively perform tasks described as being performed by the methods, apparatus, computing devices, and/or systems as described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer-implemented method comprising:
providing, by a user, one or more demonstrations of a video game entity interacting with a video game environment to achieve a goal, each of the demonstrations specifying one or more actions performed by the video game entity in the video game environment at each of one or more time steps;
generating, from the one or more demonstrations, one or more training examples, each training example associated with a time step of a demonstration and comprising: (i) a segmented map of an area of the video game environment comprising the video game entity, (ii) entity data for the video game entity, wherein the entity data comprises a representation of a state of the video game entity with respect to the goal, (iii) entity data for each of one or more other video game entities in the video game environment, and (iv) one or more target actions performed by the video game entity for the time step of the training example;
training an agent to control the video game entity using a neural network, comprising:
generating, for each training example, one or more predicted actions for the training example by processing, using the neural network, input data derived from the training example, wherein the segmented map of each training example comprises an integer-coded representation of the area of the video game environment comprising the video game entity, and the neural network comprises a segmented map processing portion comprising one or more convolutional neural network layers; and
updating parameters of the neural network based on a comparison between the one or more predicted actions of the training examples and the one or more corresponding target actions of the training examples; and performing validation of the video game environment, comprising controlling the video game entity in the video game environment using the trained agent.

2. The method of claim 1, wherein performing validation of the video game environment comprises:
providing, by the user, one or more corrected demonstrations in response to the agent controlling the video game entity in the video game environment using the updated neural network; and
further training the agent to control the video game entity using the one or more training examples and one or more corrected training examples generated from the one or more corrected demonstrations, comprising further updating parameters of the neural network.

3. The method of claim 1, wherein performing validation of the video game environment comprises:
providing, by the user, a modification to the video game environment;
providing, by the user, one or more corrected demonstrations in response to the agent controlling the video game entity in the modified video game environment using the updated neural network; and
further training the agent to control the video game entity using the one or more training examples and one or more corrected training examples generated from the one or more corrected demonstrations, comprising further updating parameters of the neural network.

4. The method of claim 1, wherein the input data derived from a training example comprises: (i) the segmented map of an area of the video game environment comprising the video game entity, (ii) the entity data for the video game entity, and (iii) the entity data for each of one or more other video game entities in the video game environment.

5. The method of claim 4, wherein the neural network comprises a segmented map processing portion, an entity data processing portion, and a further entity data processing portion, and wherein processing, using the neural network, input data derived from the training example comprises:
processing the segmented map using the segmented map processing portion to generate a segmented map embedding;
processing the entity data for the video game entity using the entity data processing portion to generate an entity embedding;
processing, for each of the one or more other video game entities, the entity data for the other video game entity to generate another entity embedding;
combining, for each other entity embedding, the other entity embedding with the entity embedding to generate a combined entity embedding; and
processing the one or more combined entity embeddings and the segmented map embedding to generate an output representing one or more predicted actions for the training example.

6. The method of claim 5, wherein processing the one or more combined entity embeddings and the segmented map embedding to generate the output representing one or more predicted actions for the training example comprises:
processing the one or more combined entity embeddings using an attention mechanism of the neural network to generate a single combined embedding; and
processing a combination of the single combined embedding and the segmented map embedding using an output portion of the neural network to generate the output.

7. The method of claim 6, wherein processing the one or more combined entity embeddings using the attention mechanism of the neural network to generate a single combined embedding comprises processing the one or more combined entity embeddings using one or more transformer encoder layers of the neural network.

8. The method of claim 1, wherein the integer-coded representation of the area of the video game environment comprising the video game entity is a two-dimensional integer coded representation or a three-dimensional integer-coded representation, and the one or more convolutional neural network layers are one or more two-dimensional convolutional neural network layers or one or more three-dimensional convolutional neural network layers, respectively.

9. The method of claim 1, wherein the entity data comprises relative co-ordinate data based on the position of the video game entity in the video game environment and the position of a location corresponding to the goal.

10. The method of claim 1, wherein the entity data further comprises attribute information for the video game entity.

11. A computing system comprising one or more computing devices configured to:
receive, from a user, one or more demonstrations of a video game entity interacting with a video game environment to achieve a goal, each of the demonstrations specifying one or more actions performed by the video game entity in the video game environment at each of one or more time steps;
generate, from the one or more demonstrations, one or more training examples, each training example associated with a time step of a demonstration and comprising: (i) a segmented map of an area of the video game environment comprising the video game entity, (ii) entity data for the video game entity, wherein the entity data comprises a representation of a state of the video game entity with respect to the goal, (iii) entity data for each of one or more other video game entities in the video game environment, and (iv) one or more target actions performed by the video game entity for the time step of the training example;
train an agent to control the video game entity using a neural network, comprising:
generating, for each training example, one or more predicted actions for the training example by processing, using the neural network, input data derived from the training example, wherein the segmented map of each training example comprises an integer-coded representation of the area of the video game environment comprising the video game entity, and the neural network comprises a segmented map processing portion comprising one or more convolutional neural network layers; and
updating parameters of the neural network based on a comparison between the one or more predicted actions of the training examples and the one or more corresponding target actions of the training examples; and
perform validation of the video game environment, comprising controlling the video game entity in the video game environment using the trained agent.

12. The computing system of claim 11, wherein performing validation of the video game environment comprises:
providing, by the user, one or more corrected demonstrations in response to the agent controlling the video game entity in the video game environment using the updated neural network; and
further training the agent to control the video game entity using the one or more training examples and one or more corrected training examples generated from the one or more corrected demonstrations, comprising further updating parameters of the neural network.

13. The computing system of claim 11, wherein performing validation of the video game environment comprises:
providing, by the user, a modification to the video game environment;
providing, by the user, one or more corrected demonstrations in response to the agent controlling the video game entity in the modified video game environment using the updated neural network; and
further training the agent to control the video game entity using the one or more training examples and one or more corrected training examples generated from the one or more corrected demonstrations, comprising further updating parameters of the neural network.

14. The computing system of claim 11, wherein the input data derived from a training example comprises: (i) the segmented map of an area of the video game environment comprising the video game entity, (ii) the entity data for the video game entity, and (iii) the entity data for each of one or more other video game entities in the video game environment.

15. The computing system of claim 14, wherein the neural network comprises a segmented map processing portion, an entity data processing portion, and a further entity data processing portion, and wherein processing, using the neural network, input data derived from the training example comprises:
processing the segmented map using the segmented map processing portion to generate a segmented map embedding;
processing the entity data for the video game entity using the entity data processing portion to generate an entity embedding;
processing, for each of the one or more other video game entities, the entity data for the other video game entity to generate another entity embedding;
combining, for each other entity embedding, the other entity embedding with the entity embedding to generate a combined entity embedding; and
processing the one or more combined entity embeddings and the segmented map embedding to generate an output representing one or more predicted actions for the training example.

16. A non-transitory computer-readable medium, which when executed by a processor, cause the processor to:
receive, from a user, one or more demonstrations of a video game entity interacting with a video game environment to achieve a goal, each of the demonstrations specifying one or more actions performed by the video game entity in the video game environment at each of one or more time steps;
generate, from the one or more demonstrations, one or more training examples, each training example associated with a time step of a demonstration and comprising: (i) a segmented map of an area of the video game environment comprising the video game entity, (ii) entity data for the video game entity, wherein the entity data comprises a representation of a state of the video game entity with respect to the goal, (iii) entity data for each of one or more other video game entities in the video game environment, and (iv) one or more target actions performed by the video game entity for the time step of the training example;
train an agent to control the video game entity using a neural network, comprising:
generating, for each training example, one or more predicted actions for the training example by processing, using the neural network, input data derived from the training example, wherein the segmented map of each training example comprises an integer-coded representation of the area of the video game environment comprising the video game entity, and the neural network comprises a segmented map processing portion comprising one or more convolutional neural network layers; and
updating parameters of the neural network based on a comparison between the one or more predicted actions of the training examples and the one or more corresponding target actions of the training examples; and
perform validation of the video game environment, comprising controlling the video game entity in the video game environment using the trained agent.

17. The non-transitory computer-readable medium of claim 16, wherein performing validation of the video game environment comprises:
providing, by the user, one or more corrected demonstrations in response to the agent controlling the video game entity in the video game environment using the updated neural network; and
further training the agent to control the video game entity using the one or more training examples and one or more corrected training examples generated from the one or more corrected demonstrations, comprising further updating parameters of the neural network.

18. The non-transitory computer-readable medium of claim 16, wherein performing validation of the video game environment comprises:
providing, by the user, a modification to the video game environment;
providing, by the user, one or more corrected demonstrations in response to the agent controlling the video game entity in the modified video game environment using the updated neural network; and
further training the agent to control the video game entity using the one or more training examples and one or more corrected training examples generated from the one or more corrected demonstrations, comprising further updating parameters of the neural network.

19. The non-transitory computer-readable medium of claim 16, wherein the input data derived from a training example comprises: (i) the segmented map of an area of the video game environment comprising the video game entity, (ii) the entity data for the video game entity, and (iii) the entity data for each of one or more other video game entities in the video game environment.

20. The non-transitory computer-readable medium of claim 16, wherein the neural network comprises a segmented map processing portion, an entity data processing portion, and a further entity data processing portion, and wherein processing, using the neural network, input data derived from the training example comprises:
processing the segmented map using the segmented map processing portion to generate a segmented map embedding;
processing the entity data for the video game entity using the entity data processing portion to generate an entity embedding;
processing, for each of the one or more other video game entities, the entity data for the other video game entity to generate another entity embedding;

combining, for each other entity embedding, the other entity embedding with the entity embedding to generate a combined entity embedding; and processing the one or more combined entity embeddings and the segmented map embedding to generate an output representing one or more predicted actions for the training example.

\* \* \* \* \*